(12) United States Patent
Brown et al.

(10) Patent No.: US 7,496,639 B2
(45) Date of Patent: *Feb. 24, 2009

(54) INDIVIDUALLY SPECIFYING MESSAGE OUTPUT ATTRIBUTES IN A MESSAGING SYSTEM

(75) Inventors: Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 11/466,453

(22) Filed: Aug. 23, 2006

(65) Prior Publication Data

US 2007/0067404 A1   Mar. 22, 2007

Related U.S. Application Data

(62) Division of application No. 09/915,995, filed on Jul. 26, 2001, now Pat. No. 7,185,057.

(51) Int. Cl.
*G06F 15/16* (2006.01)

(52) U.S. Cl. ..................... 709/217; 709/204

(58) Field of Classification Search ......... 709/201–203, 709/217–227, 204–206
See application file for complete search history.

(56) References Cited

U.S. PATENT DOCUMENTS

| | | | |
|---|---|---|---|
| 5,420,978 A | 5/1995 | Tozawa et al. | |
| 5,513,126 A | 4/1996 | Harkins et al. | |
| 5,949,413 A | 9/1999 | Lerissa et al. | |
| 6,161,130 A | 12/2000 | Horvitz et al. | |
| 6,192,396 B1 | 2/2001 | Kohler | |
| 6,463,462 B1 | 10/2002 | Smith et al. | |
| 6,690,773 B1 * | 2/2004 | Law | 379/88.22 |
| 2003/0023682 A1 | 1/2003 | Brown et al. | |
| 2003/0023683 A1 | 1/2003 | Brown et al. | |
| 2007/0081642 A1 * | 4/2007 | Owens et al. | 379/93.24 |

* cited by examiner

*Primary Examiner*—Moustafa M Meky
(74) *Attorney, Agent, or Firm*—Matthew W. Baca; Amy J. Pattillo

(57) ABSTRACT

A message entry is received in association with a particular topic from among multiple available topics from a particular user from among multiple users participating in a messaging session. Output attributes are assigned to the message entry according to receiving user specified output preferences for the particular topic individually specified by each of the receiving users participating in the messaging session, such that output of the message entry is uniquely specified for each of the receiving users participating.

5 Claims, 11 Drawing Sheets

INDIVIDUALLY SPECIFYING MESSAGE OUTPUT ATTRIBUTES IN A MESSAGING SYSTEM

CROSS-REFERENCE TO RELATED APPLICATIONS

This application is a divisional of commonly assigned U.S. patent application Ser. No. 09/915,995, filed Jul. 26, 2001 now U.S. Pat. No. 7,185,057, which is hereby incorporated herein by reference.
(1) U.S. patent application Ser. No. 09/915,974
(2) U.S. patent application Ser. No. 09/915,540
(3) U.S. patent application Ser. No. 09/915,465
(4) U.S. patent application Ser. No. 09/915,458
(5) U.S. patent application Ser. No. 09/915,490
(6) U.S. patent application Ser. No. 09/915,511; and
(7) U.S. patent application Ser. No. 09/915,450.

BACKGROUND OF THE INVENTION

1. Technical Field

The present invention relates in general to electronic communications and, in particular, to specifying messaging outputs. Still more particularly, the present invention relates to assigning distinguishable output attributes to each message according to each receiving user's preferences.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, instant messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through on-line services and provide a data communication channel that links computers and permits users to converse by sending text messages to one another in real-time.

In current instant messaging systems, multiple topics of conversation may take place within a single channel, particularly where the channel is designated for a broad topic. This can occur easily where, for example, multiple users select a particular channel that is designated for discussion of movies and a discussion begins about a first movie. Then, as additional users enter the channel or current users want to move onto discussion of a second movie, discussions of the first and second movie may intermingle in a single thread of conversation. As more and more topics are discussed within a single channel, it typically becomes increasingly more difficult to follow comments being made.

In a business context, efficient communication between employees is important. Instant messaging systems may provide employees a way of communicating in real-time without leaving a desk and providing an opportunity to continue working while communicating from a remote location. In addition, multiple computer platforms may utilize instant messaging so that potentially, one employee may be at a workstation in one office, another at a workstation in another location and another participating in the instant messaging session via a portable telephone or other personal electronic device.

However, in business and other contexts, instant messaging is limited in that if users want to distinguish between topics, all the users discussing the current topic must enter another channel to start discussion about a new topic.

Another limitation in current instant messaging is in the types of display options available to the users. Each sending user may select a color for their messages to be displayed on other machines, however each sending user at his own machine is not able to change the display attributes of other's messages.

Another limitation in current instant messaging is that a receiving user cannot filter out particular messages or particular users from a messaging session. Moreover, a receiving user cannot select to emphasize comments from a particular participant or on a particular topic.

In view of the foregoing, it would be advantageous to provide a method, system and program for associating attributes with each user's comments and within each topic within a single channel of a messaging system. Moreover, it would be advantageous to allow each receiving user to designate output preferences for receiving messages according to user and topic. Furthermore, it would be advantageous to allow each receiving user to designate such output preferences that vary according to the device the receiving user is currently utilizing from among multiple available devices to the receiving user.

SUMMARY OF THE INVENTION

In view of the foregoing, it is therefore an object of the present invention to provide an improved method, system and program for performing electronic communications.

It is another object of the present invention to provide a method, system and program for specifying messaging outputs.

It is yet another object of the present invention to provide a method, system and program for assigning distinguishable output attributes to each message according to each receiving user's preferences.

According to one aspect of the invention, multiple message entries are received that are intended for a particular recipient and each are associated with a particulartopic from among multiple topics within a particular channel of an instant messaging session. Output of the message entries is controlled according to output attributes assigned to the message entries for a particular recipient to distinguish between the topics according to preferences of the particular recipient, such that output of the message entries according to topic is distinguished according to the particular recipient receiving the message entries.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
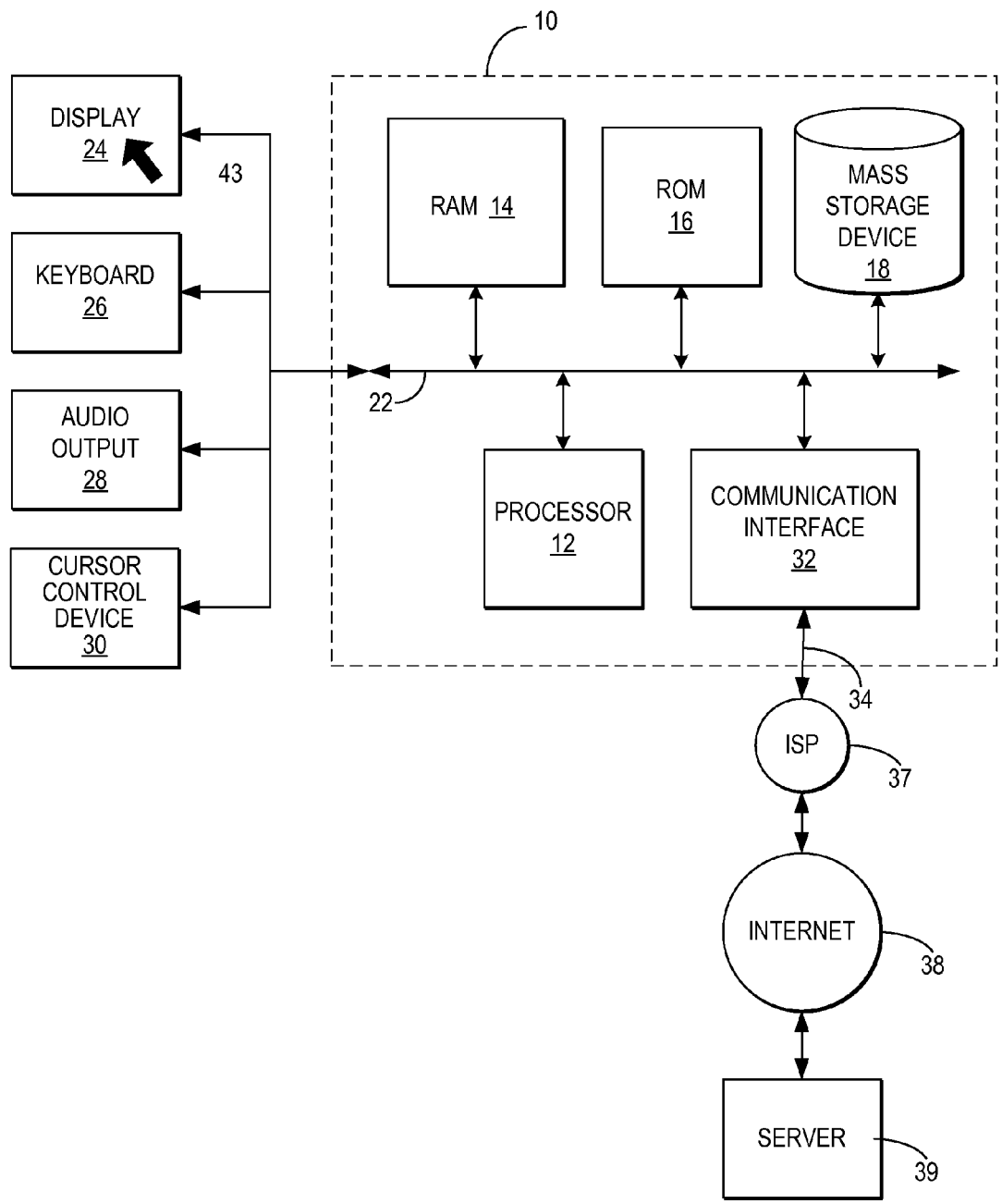
FIG. 1 depicts one embodiment of a computer system with which the method, system and program of the present invention may advantageously be utilized.

A method, system and program for customizing output for each receiving user in a messaging session according to attribute assignments by user and by topic are provided. In the present invention, "outputs" preferably include, but are not limited to, graphical display output and audible output. "Attributes" are characteristics assigned to messages that specify a manner of output. For example, a graphical attribute may specify the manner in which a message will be displayed graphically while an audible attribute may specify the manner in which a message will be audibly generated.

In addition, in the present invention, "user" preferably refers to the individual, group, organization, business or corporation participating in a messaging system. A "new user" may refer to a user who is participating in a messaging system for the first time and/or a user who is joining a session in progress. "Current users" are those users that are currently participating in a messaging session whether those users are participating by auditing, editing, recording, or adding to the conversation. Further, current users may include those users who are registered with a messaging system, whether participating or not.

Preferably, for purposes of the present invention, a "sending user" is the user initiating a message entry and may provide an identifier for an intended receiving user. A "receiving user" is the user to whom a message entry is transmitted specifically to or who receives the message through participation in a chat room or other messaging session.

Moreover, in the present invention, "topic" preferably refers to a subject matter that is typically referred to by a textual word or words, however may also include audible signals and graphical representations of a subject matter.

A "messaging session" preferably includes, but is not limited to, any combination of voice and/or text messages, instant and/or delayed, transmitted between multiple users via a network. Messaging sessions may include use of chat rooms, instant messages, e-mail, conference calling and other network methods of providing a channel for users to communicate within. Further, messaging sessions may include communications such as voice and text transmissions between multiple telephony devices.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 4, 5, 6, 7, 8 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. Keyboard 26 and cursor control device 30 can control the position of a cursor 43 positioned within a display area 32 of display 24. In alternate embodiments of the present invention, additional input and output peripheral components may be added.

Messaging Systems Context

Figure 2:
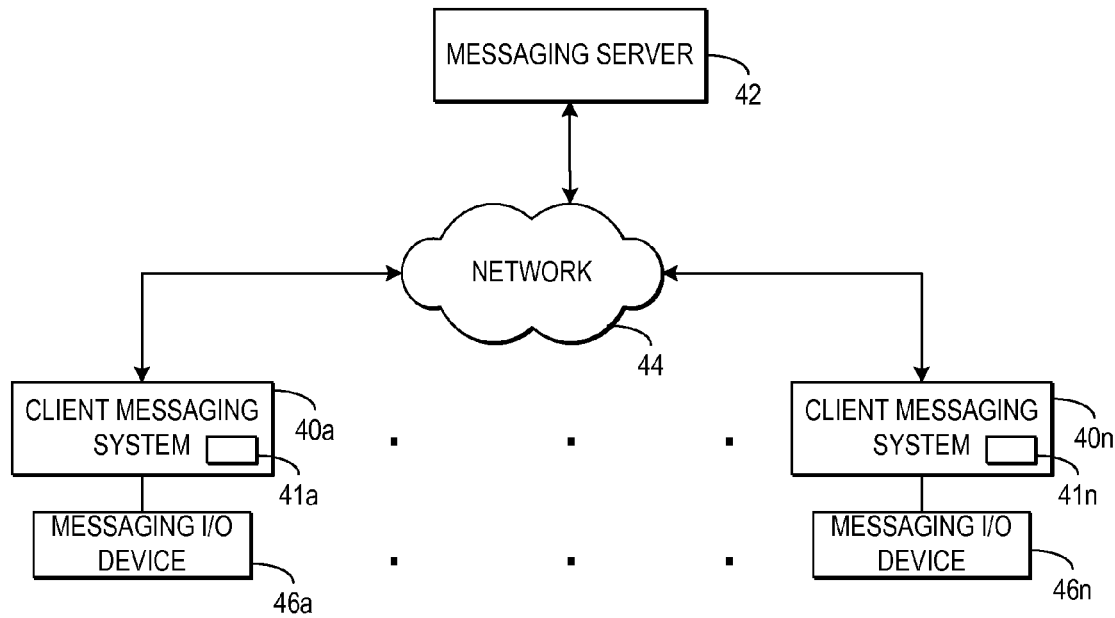
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a-40n and render Web documents (pages) served by at least one messaging server such as messaging server 42. Additionally, each of client messaging systems 40a-40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a-40n engaged in peer-to-peer network communications via a network 44.

The Web may refer to the total set of interlinked hypertext documents residing on servers all around the world. A network 44, such as the Internet, provides an infrastructure for transmitting these hypertext documents between client messaging systems 40a-40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client (or sending user) enters a message via a messaging input/output (I/O) device for a messaging session at a client messaging system such as client messaging system 40*a*. The message entry is transmitted to messaging server 42. Messaging server 42 then assigns attributes to the message for each receiving user participating in the messaging session according to each receiving user's preferences and distributes the message to the participating receiving users via network 44. For example, a receiving user participating in the messaging session via client messaging system 40*n* may receive the message with attributes that are then output to a messaging I/O device 46*n*.

Advantageously, according to one embodiment of the present invention, the steps of submitting a message entry, receiving messaging session entries, controlling display of messaging session entries, and other functions may be performed by an application executing in each of client messaging systems 40*a*-40*n*, such as client messaging applications 41*a*-41*n*.

Figure 3:
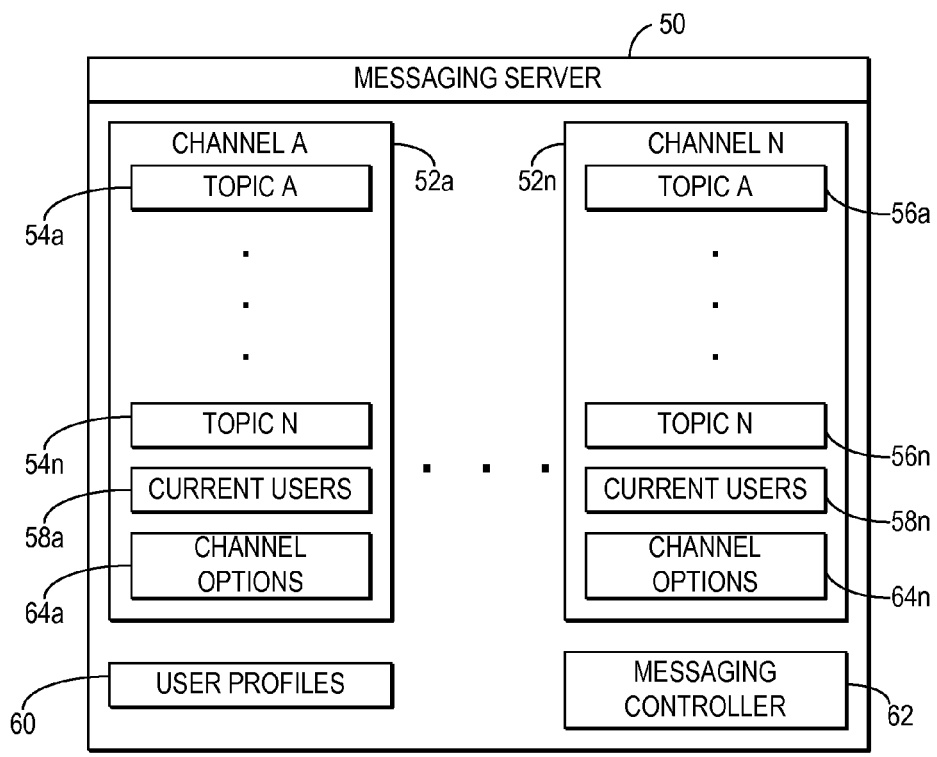
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted messaging server 50 includes a messaging controller 62 that is provided to control the process steps of messaging server 50 as will be further described.

Messaging server 50 also includes multiple channels 52*a*-52*n*. Each of channels 52*a*-52*n* may represent a separate information path within messaging server 50. Messaging server 50 may have a defined number of channels 52*a*-52*n* or may allow users to create new channels as needed.

Each of channels 52*a*-52*n* preferably includes multiple topics. In the present example, channel 52*a* includes topics 54*a*-54*n* and channel 52*n* includes topics 56*a*-56*n*. Messaging server 50 may have a finite number of topics that may be pre-defined for each channel or may allow users to created new topics as needed.

In addition, each of channels 52*a*-52*n* preferably includes a table of current users 58*a*-58*n*. As a user selects to participate in channels 52*a*-52*n*, the user's identification is added to the table of current users 58*a*-58*n* for that channel. In particular, the table of current users 58*a*-58*n* may further specify participation in a selection of topics from among the topics available in a selected channel.

Preferably, as messaging server 50 receives messages, they are stored according to the channel, topic and sending user and then distributed to each of the receiving users participating in that channel. Further, messaging server 50 may distribute messages to receiving users participating in a channel and more specifically participating in a particular topic or topics within a channel.

Messaging server 50 includes a user profiles database 60 that includes profile information for each user including, but not limited to, a user identification, a name, an address, an electronic mail (e-mail) address, and a user history recorded as the user participates in messaging services. The user identification stored in user profiles 60 during registration is utilized across multiple channels for identifying messages posted by that user. In addition, a user may have a single "screen name" or other textual identifier or multiple "screen names" to identify a single user.

In particular, the user history included in user profiles database 60 may include a history of channels and topics that have been initiated by each user or that each user has participated in. Advantageously, messaging server 50 may determine a selection of messaging channels and topics that a user frequently initiates or participates in and provide those topics in the form of selectable outputs such that the user may quickly select from frequently discussed topics. Further, the user may designate topics that are frequently discussed or that the user prefers to have available in a reference list or selectable output.

Each of channels 58*a*-58*n* further includes channel options 64*a*-64*n*. Channel options may include, but are not limited to, distinguishing users, distinguishing topics, selecting users to show, selecting topics to show, saving threads by user, saving threads by topic, adding topics, and deleting topics. The channel options for each channel may be pre-determined by message server 50 or may be available for users to define when a channel and/or topic is added. By defining the channel options and more specifically by defining options for individual topics within a channel, the options given to users for customizing outputs may be controlled. For example, a channel option may specify the distinguishable attribute for particular users, topics, or devices. Further, a channel option may limit what types of distinguishable attributes may be assigned by each receiving user. Further, a channel option may limit which users, topics, and types of devices may be utilized within a particular channel.

A messaging controller 62 is advantageously a software application executing within messaging server 50 to allow users to customize messaging output before, during and after a session. For example, a sending user may select the attributes for a particular topic and then initiate that topic. Alternatively, a sending or receiving user may adjust output preferences for a topic already in progress. Moreover, a receiving user may adjust attributes for an entire session after the session has concluded. In one embodiment, messaging controller 62 will adjust the attributes assigned to messages within a particular messaging session according to receiving user selections of output preferences. Alternatively, software executing on the client system may adjust the attributes assigned to messages within a particular messaging session according to receiving user selections of output preferences.

Allowing sending and receiving users to create and specify multiple topics within a particular channel in an instant messaging context is particularly advantageous because multiple windows each associated with a particular topic may be initiated between two users participating in the instant messaging session. In particular, messaging controller 62 may further allow a receiving user to designate levels of activity of a conversation. For example, a window associated with a particular topic may be left open, but may be indicated as an old conversation, while a new topic window may be designated as a new conversation.

Figure 4:
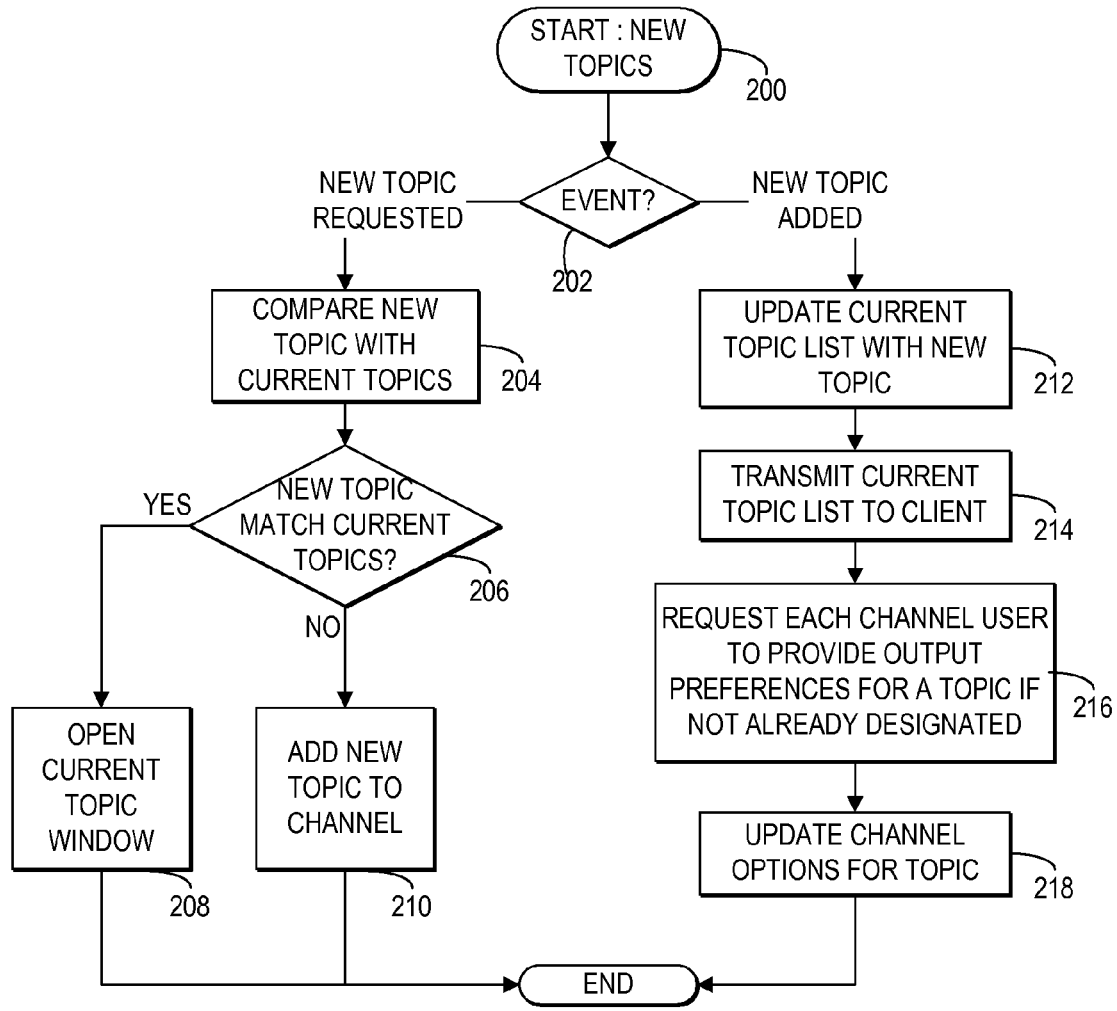
FIG. 4 illustrates a high level logic flowchart of a process and program for adding new topics to a channel in accordance with the method, system and program of the present invention.

With reference now to FIG. 4, there is depicted a high level logic flowchart of a process and program for adding new topics to a channel in accordance with the method, system and program of the present invention. As illustrated, the process starts at block 200 and thereafter proceeds to block 202. Block 202 depicts a determination as to which event occurred when an event occurs. If a new topic is requested, then the process passes to block 204. If a new topic is added, then the process passes to block 212.

Block 204 depicts comparing the new topic with current topics open in the current channel and if preferable, in other channels. Next, block 206 illustrates a determination as to whether the new topic matches a current topic. If the new topic matches a current topic, then the process passes to block 208. Block 208 depicts opening the current topic that matches the new topic into a new window for the user requesting the new topic and the process ends. Alternatively, the user may be notified of the current topic in an alternate manner such as a textual message or a graphical indicator.

At block 206, if the new topic does not match a current topic, then the process passes to block 210. Block 210 depicts adding the new topic to the channel and the process ends.

To add a new topic to a channel, block 212 illustrates updating the current topic list for the channel with the new topic. Next, block 214 depicts transmitting the current topic list to all current users within the channel. Thereafter, block 216 illustrates requesting that current channel users select an attribute for the new topic if an attribute is not already selected for that new topic and the process passes to block 218. In addition to current users adding a new topic to a channel, the messaging system may initiate new topics within a channel, topics within a channel may be scheduled to begin at a particular time or other triggers may be provided to add new topics. Moreover, a new topic may include topics that have previously been utilized within a channel, however are not currently active within that channel.

Block 218 depicts updating the channel options for the added topic and the process ends. Preferably, channel options may be set by a variety of levels of users and may define the range of attributes and other options that are available for a channel. When a topic is added to a channel, the channel options may also be updated to define the range of attributes available for the topic.

Figure 5:
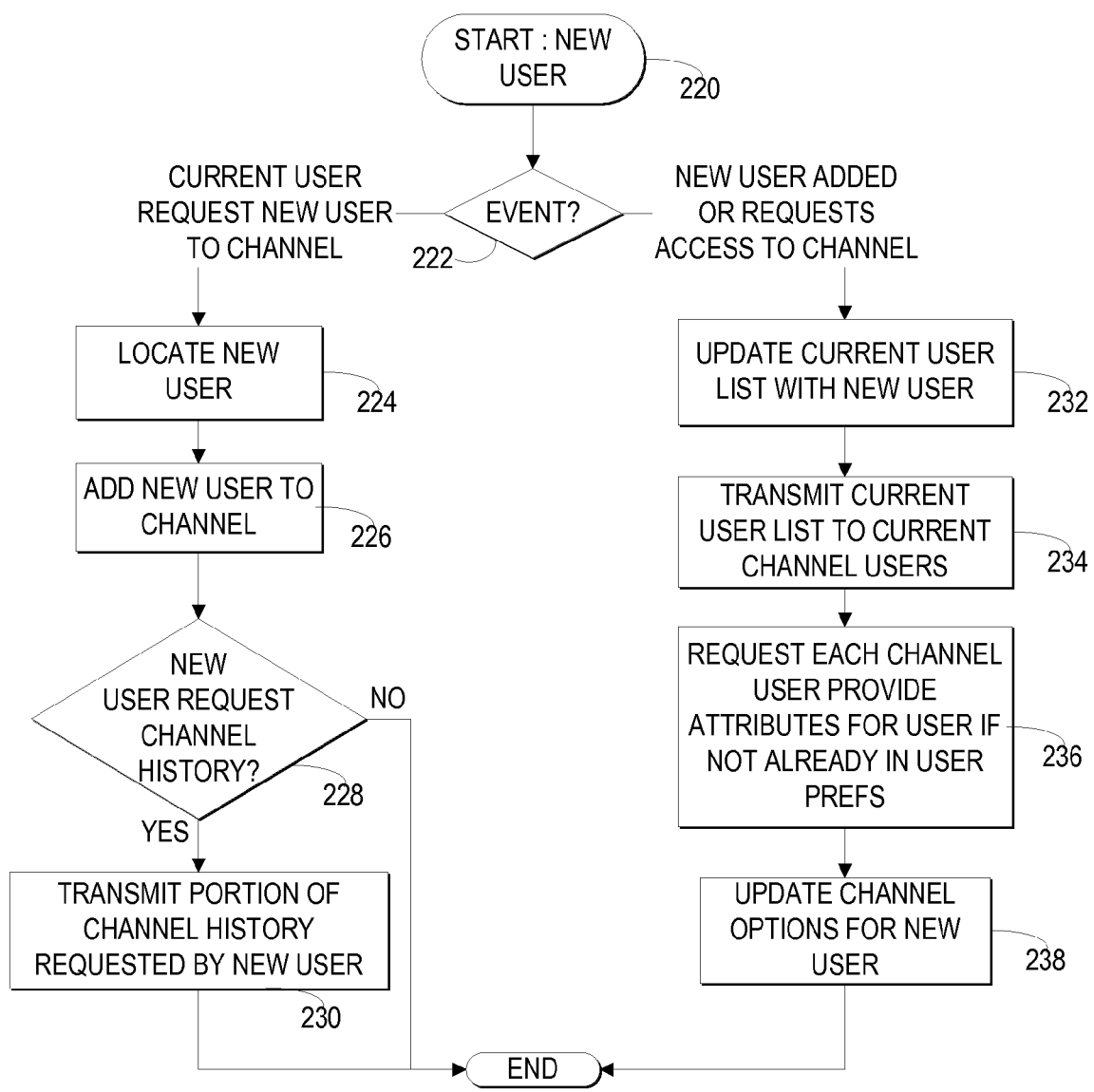
FIG. 5 depicts a high level logic flowchart of a process and program for adding new users to a channel in accordance with the method, system and program of the present invention.

Referring now to FIG. 5, there is illustrated a high level logic flowchart of a process and program for adding new users to a channel in accordance with the method, system and program of the present invention. As depicted, the process starts at block 220 and thereafter proceeds to block 222. Block 222 illustrates a determination as to what event occurred when an event occurs. If a current user requests to add a new user to a channel, then the process passes to block 224. If a new user is added to a channel or the new user requests to be added to a channel, then the process passes to block 232. In particular, a user may also request that a new user be added to a topic within a particular channel such that a user participates in only a single topic from among multiple current topics in a channel.

Block 224 depicts locating the requested new user. In locating the requested new user, the requested new user may request not to participate in the channel. In addition, in locating the user, the type of device utilized by the user to access the messaging server is detected. Next, block 226 illustrates adding the new user to the channel if the requested new user elects to participate in the channel. Thereafter, block 228 depicts a determination as to whether or not the user has requested a particular portion of the channel history. In particular, when a new user enters a channel, the most recent entries may be provided, however the new user may elect to receive a longer history of the conversations taking place. For example, the new user may request all messages within a channel for a particular topic within the channel. If a user does request a portion of the channel history, then the process passes to block 230 which illustrates transmitting the portion of channel history requested by the new user and the process ends. If a user does not request a portion of the channel history, then the process ends.

Block 232 illustrates updating the current user list with the new user. Next, block 234 depicts transmitting the current user list to current users. Thereafter, block 236 illustrates requesting that current channel users select an attribute for the new user if an attribute is not already selected for that new user and the process passes to block 238.

Block 238 depicts updating the channel options for the added user and the process ends. Preferably, channel options may be set by a variety of levels of users and may define the range of attributes and other options that are available for a channel. In particular, when a new user is added to a channel, the range of attributes available to the user may be set in the channel options.

Figure 6:
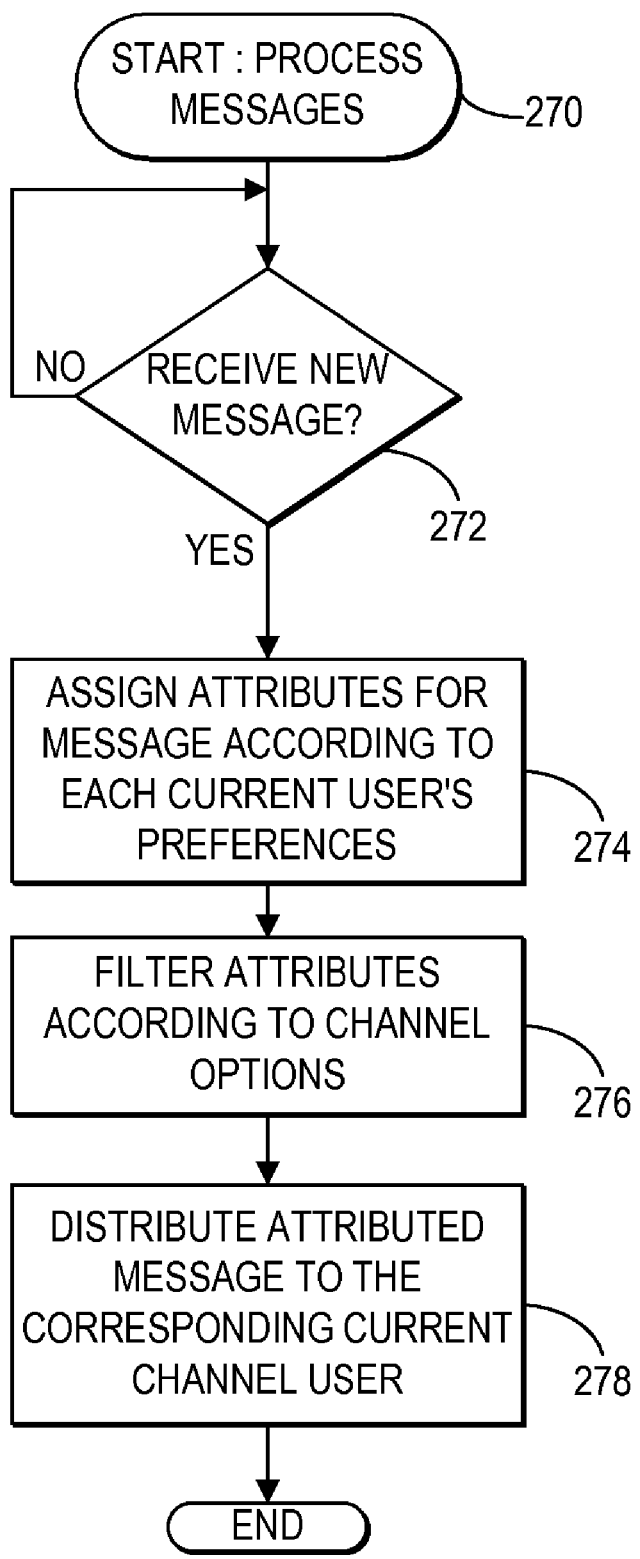
FIG. 6 illustrates a high level logic flowchart of a process and program for processing and distributing messages in accordance with the method, system and program of the present invention.

With reference now to FIG. 6, there is illustrated a high level logic flowchart of a process and program for processing and distributing messages in accordance with the method, system and program of the present invention. As depicted, the process starts at block 270 and thereafter proceeds to block 272. Block 272 illustrates a determination as to whether or not a new message is received. If a new message is not received, then the process iterates at block 272. If a new message is received, then the process passes to block 274.

Block 274 depicts assigning attributes for the new message according to current receiving user preferences for each of the current receiving users within the channel with which the new message is associated. Next, block 276 illustrates filtering the new message according to channel options. For example, if a manager initiates a channel, the manager may designate in the channel options that text from the manager must appear in a particular format regardless of any attributes for the manager text selected by the other current receiving users of the channel. More specifically, channel options for particular topics within the channel may be designated. Thereafter, block 278 depicts distributing the attributed new message to the current receiving channel users and the process ends. As will be further described, in an alternate embodiment of the present invention, both the messaging server system and client messaging system or one of the systems may assign attributes to messages.

Client System Context

Figure 7:
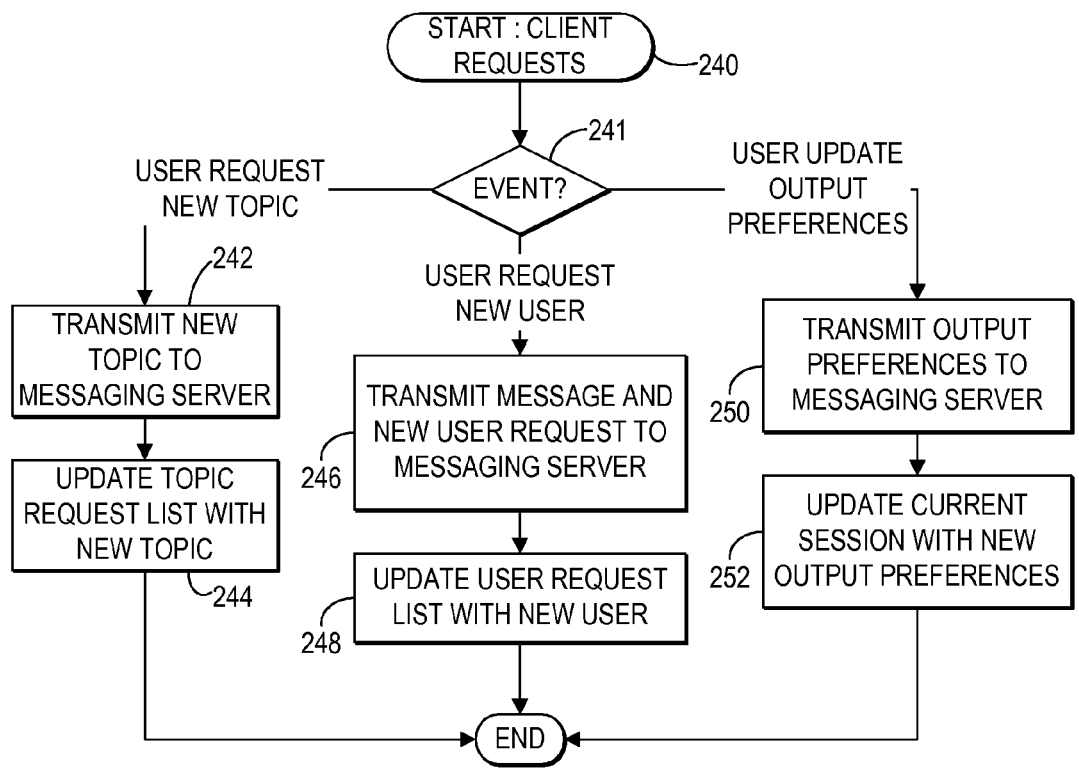
FIG. 7 depicts a high level logic flowchart of a process and program for responding to user requests in a client messaging system in accordance with the method, system and program of the present invention.

Referring now to FIG. 7, there is depicted a high level logic flowchart of a process and program for responding to user requests in a client messaging system in accordance with the method, system and program of the present invention. As illustrated, the process starts at block 240 and thereafter proceeds to block 241. Block 241 depicts a determination as to what event occurred when an event occurs.

At block 241, if a user requests a new topic, then the process passes to block 242. Block 242 depicts transmitting the new topic to the messaging server. Next, block 244 illustrates updating the topic request list with the new topic and the process ends. In particular, the topic request list is a history of topics requested by the user stored within user history that is preferably quickly accessible to the user when the user requests to add a new topic, such that the user can select a previously requested topic. Each user is preferably provided an option for how the topic request list is provided. For example, a user may select to view only those topics that have been requested within a particular period of days, or requested a particular number of times or other criteria.

In addition, at block 241, if a current user requests a new user, then the process passes to block 246. Preferably, current users of a channel may request that new users be individually prompted to enter the channel. Block 246 depicts transmitting a message and new user request to the messaging server. In one embodiment, when a current user requests that a new user be added to the channel, that current user may provide a message to be initially presented to the user. Alternatively, the server may attach a predetermined message to the request for the new user. Next, block 248 illustrates updating the user request list with the new user if added and the process ends. As with the topic request list, the user request list is preferably provided in some selectable form to current users, such that current users are enabled to quickly select a new user from a list of previously selected users.

Moreover, at block 241, if a user selects to update output preferences, then the process passes to block 250. Block 250 depicts transmitting the selected output preferences to the messaging server for storage in association with the current user. In addition, the selected output preferences may be stored at the client messaging server. Next, block 252 illustrates updating the current messaging sessions with the new output preferences if applicable and the process ends.

Figure 8:
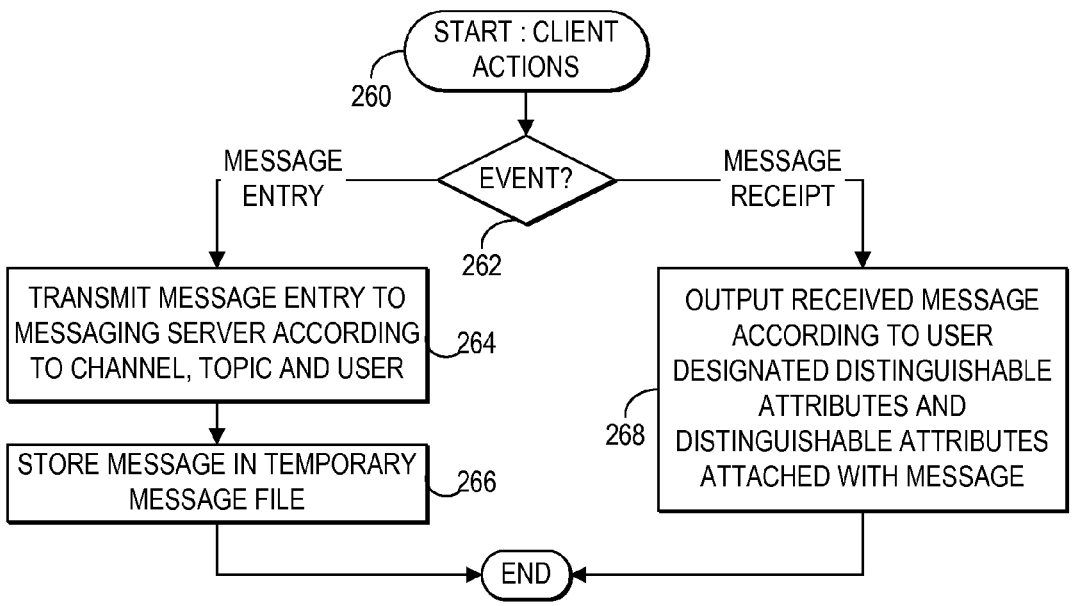
FIG. 8 illustrates a high level logic flowchart of a process and program for responding to client messaging actions in accordance with the method, system and program of the present invention.

With reference now to FIG. 8, there is illustrated a high level logic flowchart of a process and program for responding to client messaging actions in accordance with the method, system and program of the present invention. As depicted, the process starts at block 260 and thereafter proceeds to block 262. Block 262 illustrates a determination as to what event occurred when an event occurs.

If a message entry event occurs at block 262, then the process passes to block 264. Block 264 depicts transmitting the message entry to the message server according to channel, topic and user. Next, block 266 illustrates storing the message in a temporary message file and the process ends.

If a message receipt event occurs at block 262, then the process passes to block 268. Block 268 depicts outputting the received message according to the attributes assigned to the message by the messaging server according to channel options, the receiving user's attribute preferences, and other attribute designations; and the process ends. Alternatively, or in addition to the attributes assigned to the message by the messaging server, additional attributes may be assigned to the message by the client messaging system.

Figure 9:
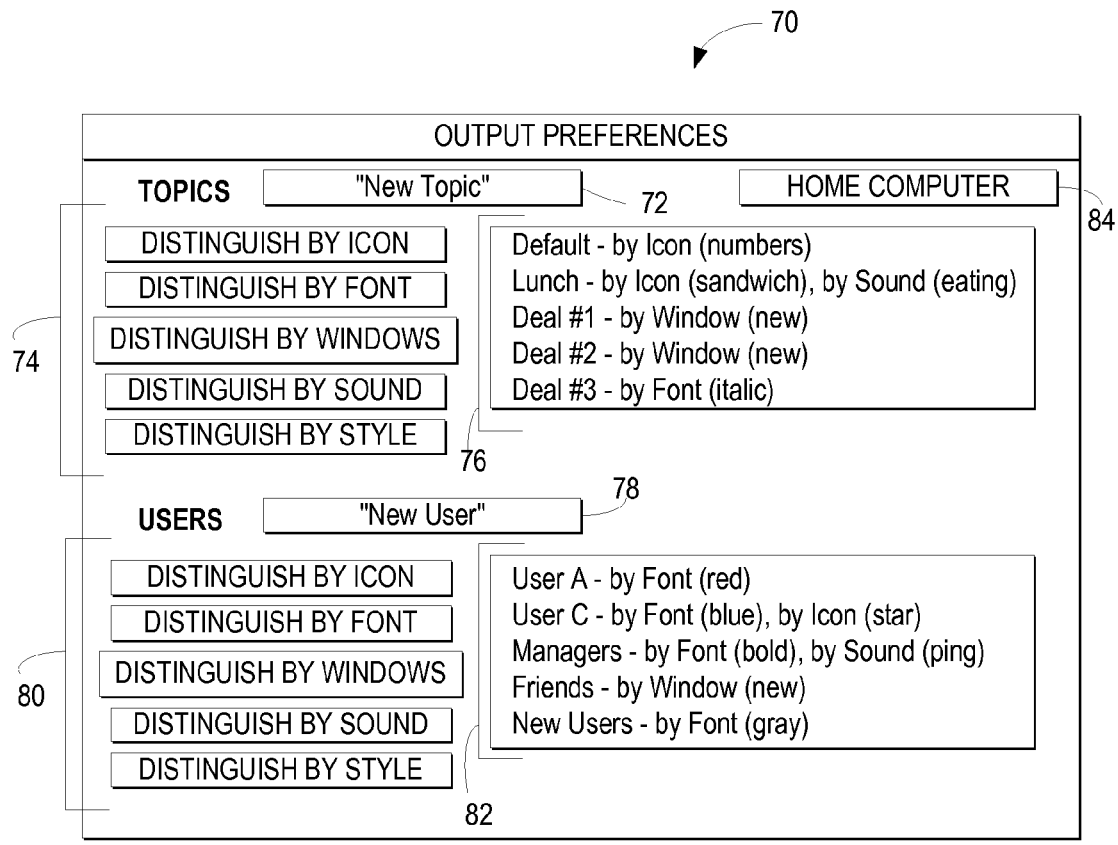
FIG. 9 depicts a graphical representation of a user preference selection window in accordance with the method, system and program of the present invention.

With reference now to FIG. 9, there is depicted a graphical representation of a user preference selection window in accordance with the method, system and program of the present invention. In particular, the present invention is particularly advantageous in that multiple computer platforms may be utilized and both graphical and audible outputs may be utilized. Therefore, it is advantageous to allow each receiving user to specify output preferences and assign attributes according to topic and remote user to facilitate each user in optimizing platform utilization.

As depicted, a user preferences selection window 70 provides for a receiving user to select output preferences by user and topic. In particular, a receiving user may select to indicate output preferences before, during, or after a messaging session.

Advantageously, each receiving user is allowed to specify output preferences for multiple platforms a single receiving user may utilize. For example, a single receiving user may utilize both a desktop computer system and a portable electronic device where the output preferences for the two platforms may differ. In the present example, the output preferences selected are for the "home computer" as indicated by reference numeral 84.

Topic block 72 includes, in this example, the "new topic" that is being introduced. The receiving user may select to assign multiple attributes to the "new topic" by selecting from among topic attribute assignments 74. Topic attribute assignments 74 are selectable buttons that allow a receiving user to distinguish the "new topic" by icon, font, windows, sound and/or style and a variable associated therewith. In addition to new topics, a receiving user may select a current topic or other topic to adjust the attributes assigned to the topic.

Topic output preferences window 76 depicts the current attributes assigned to topics. For example, when a topic is not included in the list illustrated in topic output preferences window 76, a default attribute is assigned. In this example, the default attribute distinguishes topic by icon where the variable is a number. In addition, in this example, when messages assigned to the topic "Deal #1" are received, then a new window is opened for all messages assigned to that topic.

Advantageously, a receiving user may design and name topic styles of attributes that can be selected for multiple topics. In particular, in designing a topic style, a receiving user may select from among the selections of topic attributes already assigned to topics included in topics window 76. In addition, users may share styles between one another, or the messaging server may provide styles that may be selected by the receiving user.

User block 78 includes, in this example, the "new user" that is being introduced. The receiving user may select to assign multiple attributes to the "new user" by selecting from among user attribute assignments 80. User attribute assignments 80 are selectable buttons that allow a receiving user to distinguish the "new user" by icon, font, windows, and/or sound and a variable associated therewith. In addition to new users, a receiving user may select to adjust the attribute assignments for a current or other user.

User output preference window 82 illustrates the current attributes assigned to other users. Users may include both single user identifications and groups identifiers for multiple users that have been assigned to particular groups by the current user or by the messaging server system. For example, "user A" is a single remote user identification distinguished by font and further by the variable of a red font. Alternatively, in this example, "managers" is a group identifier for multiple users where particular user identifications have been assigned to the group "managers" at the messaging server system. In the present example, messages from users included in "managers" are distinguished by a bold font and by a ping sound.

Advantageously, as described in association with topic styles, a receiving user may design and name user styles that can be selected for multiple users. In addition, users may share styles and select from styles designed by the messaging server. Moreover, topic styles and user styles may be interchangeable.

Although not depicted in the present example, distinguishing a topic or remote user by sound may include, but is not limited to, a designation of a type of automated voice in which a message is output or a particular musical melody that is played in the background of audibly output messages. Additionally, distinguishing by sound may include adjusting the volume of audible outputs according to topic or user.

Distinguishable Attributes

Figure 10:
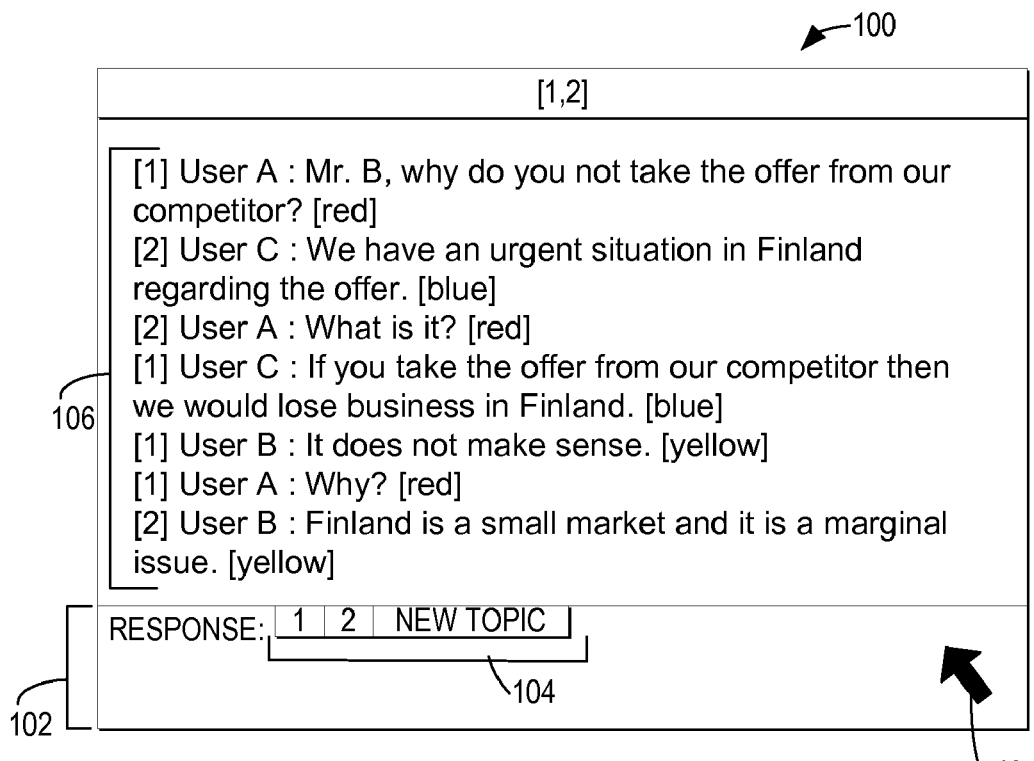
FIG. 10 illustrates a graphical representation of a messaging window with multiple entries distinguished by user and by topic within a particular channel in accordance with the method, system and program of the present invention.

With reference now to FIG. 10, there is depicted a graphical representation of a messaging window with multiple entries distinguished by user and by topic within a particular channel in accordance with the method, system and program of the present invention. As illustrated, graphical display window 100 includes multiple message entries 106 from multiple users A, B and C.

In the present example, each of messaging entries 106 is distinguished by a color designated at the end of each entry. For example, user A is distinguished by "red", user B by "yellow" and user C by "blue". In alternative embodiments, each user's entries may be distinguished by alternate colors, type faces, type sizes, icons, and other attributes that are identifiable through the media used to output user entries. For example, where user entries are output through an audio media, different computer generated voices may be utilized to distinguish each user's entries.

Preferably, the distinguishable attributes assigned to distinguish topics are then further distinguishable from the distinguishable attributes assigned to users. In the present example, topics are distinguished by an indicator "[1]" or "[2]" at the beginning of each user's entry. In alternative embodiments, topics may be distinguished in additional manners such as, but not limited to, alternate colors, type faces, type sizes, icons, and other attributes that are identifiable through the media used to output user entries. Additionally, in lieu of indicators such as "[1]", an indicator such as "[topic]" where the topic is inserted may be provided.

The present example further illustrates why assigning distinguishable attributes to multiple topics within a single channel is particularly advantageous. As depicted, user A initiates a first topic of conversation in a question to user B. User C then interjects in the same channel with a different topic containing a similar context as the first topic.

Preferably, a response block 102 is provided for a user to provide a messaging entry. In particular, a user may be a receiving user for the purposes of receiving message entries and also a sending user for the purposes of sending message entries. When a sending user provides a messaging entry, preferably the sending user indicates a topic associated with the messaging entry. In the present embodiment, a sending user may indicate a topic by selecting one of selectable buttons 104 utilizing cursor 43. Selectable buttons 104 include topics "[1]", "[2]" or a "new topic". However, as will be depicted in further embodiments, multiple types of graphical, key command and voice command methods may be provided for a sending user to indicate a topic.

Figure 11:
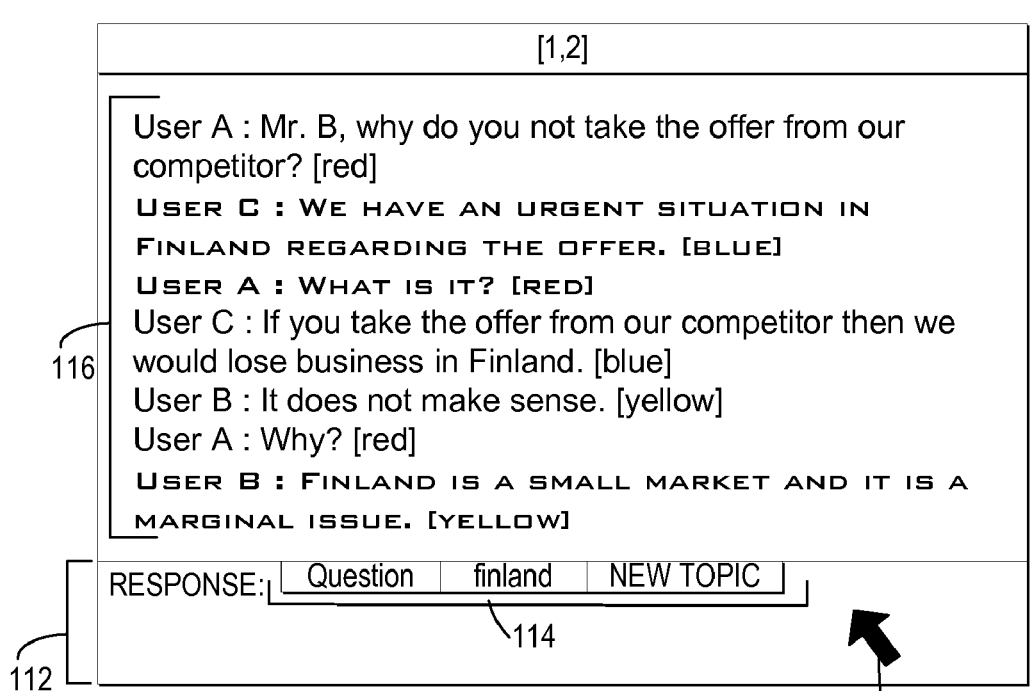
FIG. 11 depicts a graphical representation of a messaging window with multiple entries distinguished by user and by topic according to font and color in accordance with the method, system and program of the present invention.

Referring now to FIG. 11, there is illustrated a graphical representation of a messaging window with multiple entries distinguished by user and by topic according to font and color in accordance with the method, system and program of the present invention. As illustrated, graphical display window 110 includes multiple message entries 116 from multiple users A, B and C.

In the present example, each of the topics within messaging entries 116 is distinguished by font. By distinguishing topics by font and users by color, a user may follow a topic thread and which user is participating in the topic thread.

A response block 112, through which the sending user may enter messages, includes selectable buttons 114 which the sending user may select to indicate which topic is associated with the message. In the present example, selectable buttons 114 include topics "question", "Finland", and a "new topic". In particular, the topics in selectable buttons 114 are also coded by font.

Figure 12:
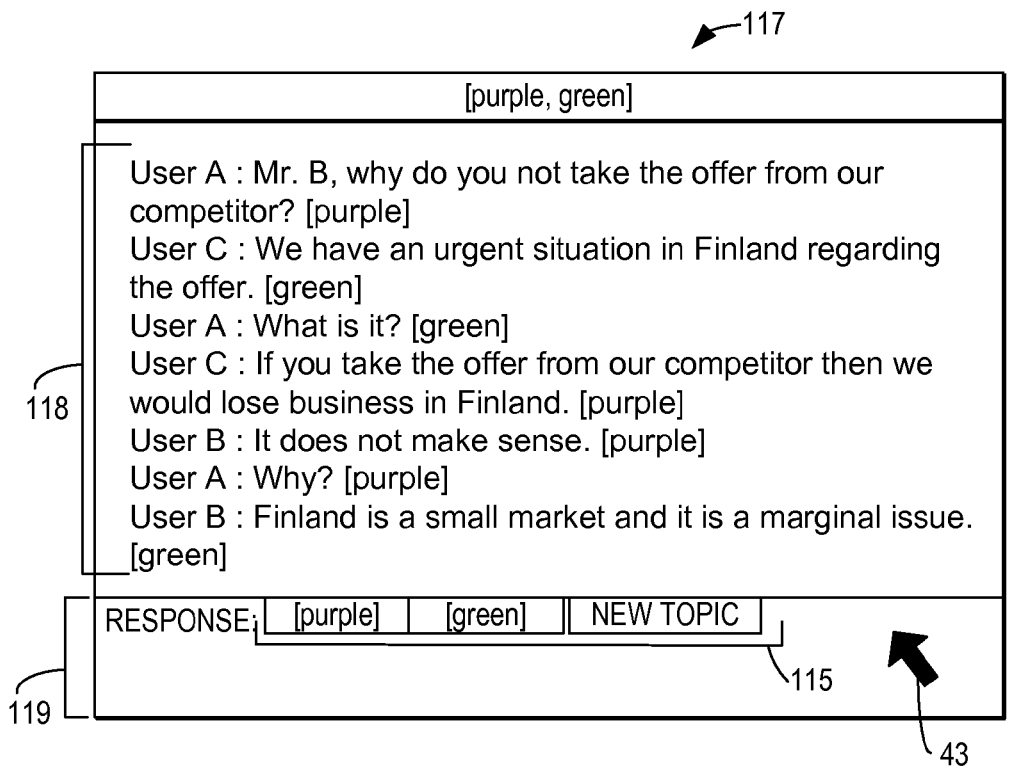
FIG. 12 illustrates a graphical representation of a messaging window with multiple entries where topics are distinguished by color in accordance with the method, system and program of the present invention.

With reference now to FIG. 12, there is depicted a graphical representation of a messaging window with multiple entries where topics are distinguished by color in accordance with the method, system and program of the present invention. As illustrated, graphical display window 117 includes multiple messages entries 118 from multiple users A, B, and C.

In the present example, each of the topics within messaging entries 118 is distinguished by color. Each of the user entries are distinguished by a tag for the user. By distinguishing topics by color and users by textual tag, a receiving user may more easily follow a topic thread and which user is participating in the topic thread.

A response block 119, through which the sending user may enter messages and select topics, includes selectable buttons 115 which the sending user may select to indicate which topic is associated with the message. In the present example, selectable buttons 115 include blocks of color attributed to each topic.

Figure 13:
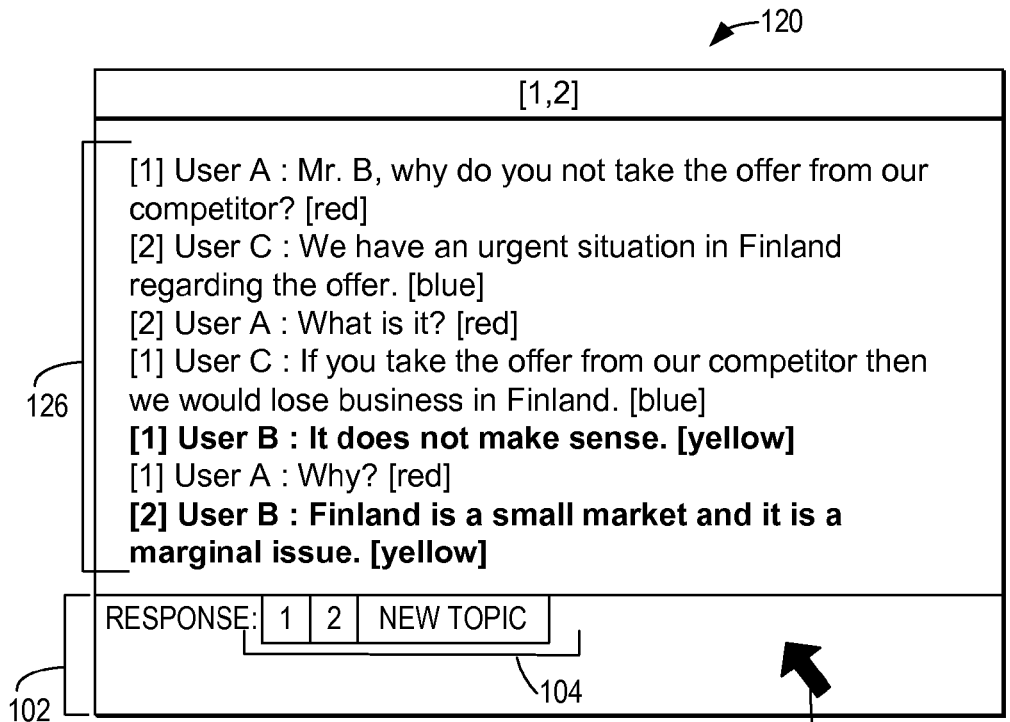
FIG. 13 depicts a graphical representation of a messaging window with multiple entries where entries by a particular user are further distinguished in accordance with the method, system and program of the present invention.

With reference now to FIG. 13, there is depicted a graphical representation of a messaging window with multiple entries where entries by a particular user are further distinguished in accordance with the method, system and program of the present invention. As illustrated, graphical display window 120 includes multiple message entries 126 from multiple users A, B, and C. As depicted in previous embodiments, each user within multiple message entries 126 is distinguished by color. However, in the present embodiment, User B is further distinguished by a bold typeface as depicted at indicator 128.

According to the present invention, each receiving user is preferably enabled to adjust the distinguishing attributes only for that receiving user's view within the boundaries provided for the channel by the channel options. For example, a receiving user may indicate that any entries received from a user assigned to a "manager" group be displayed in a particular color or a bold typeface unless the channel options set the attributes for entries from users assigned to the "manager" group. In the present embodiment, the receiving user has selected that messages from user B be displayed in a bold typeface, where, for example, user B is assigned to the "manager" group.

Message Isolations

According to the present invention, a receiving user may select to isolate message entries according to user, topic or other criteria designated by the user. Further, a receiving user may select to isolate message entries before a discussion starts, during a discussion or after the discussion has ended.

Figure 14:
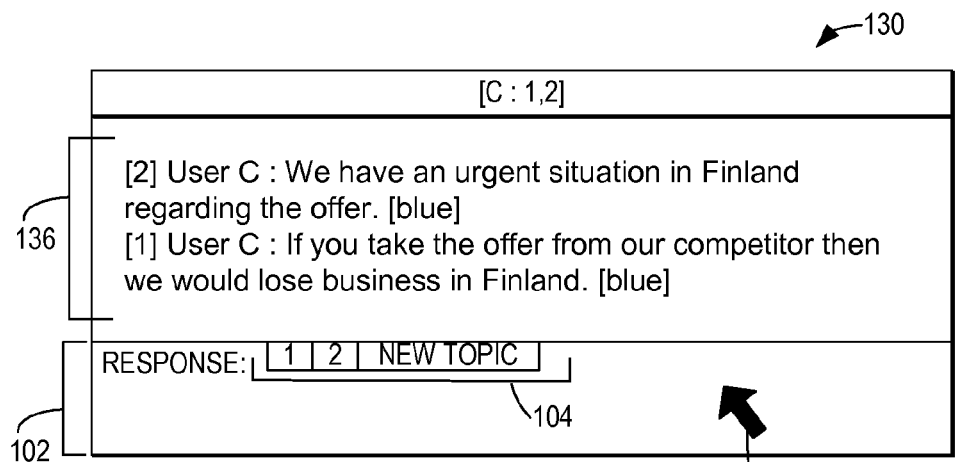
FIG. 14 illustrates a graphical representation of a messaging window with multiple entries by a particular user in accordance with the method, system and program of the present invention.

Referring now to FIG. 14, there is illustrated a graphical representation of a messaging window with multiple entries by a particular user in accordance with the method, system and program of the present invention. As depicted, graphical display window 130 includes multiple message entries 136 from user C alone out of the messages included in the session as depicted in FIG. 10. In alternate embodiments of the present invention, alternate message entries from a single user might be isolated in a single graphical window or other output format.

Figure 15:
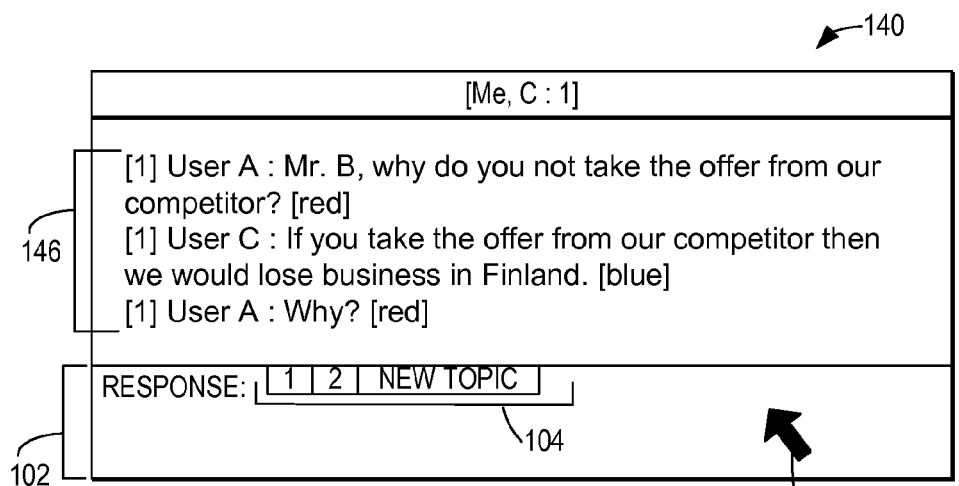
FIG. 15 depicts a graphical representation of a messaging window with multiple entries by a selection of the total users in accordance with the method, system and program of the present invention.

With reference now to FIG. 15, there is depicted a graphical representation of a messaging window with multiple entries by a selection of the total users in accordance with the method, system and program of the present invention. As illustrated, graphical display window 140 includes multiple message entries 146 from users A and C from the current messages as depicted in FIG. 10 where user A is the user viewing graphical display window 140. In alternate embodiments of the present invention, alternate message entries from a selection of the total users might be isolated in a single graphical window or other output format.

Figure 16:
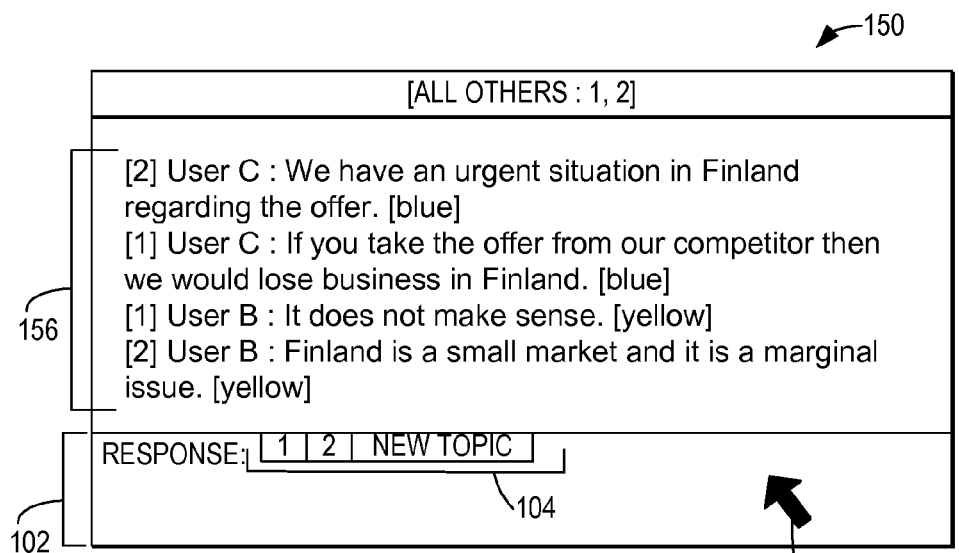
FIG. 16 illustrates a graphical representation of a messaging window with multiple entries by all users except the user currently viewing the message window in accordance with the method, system and program of the present invention.

Referring now to FIG. 16, there is illustrated a graphical representation of a messaging window with multiple entries by all users except the user currently viewing the message window in accordance with the method, system and program of the present invention. As depicted, graphical display window 150 includes multiple message entries 156 from users B and C where user A is the user viewing graphical display window 150. In alternate embodiments of the present invention, alternate message entries by all users except the user currently viewing the message window might be isolated in a single graphical window or other output format.

Multiple Output Formats

Figure 17:
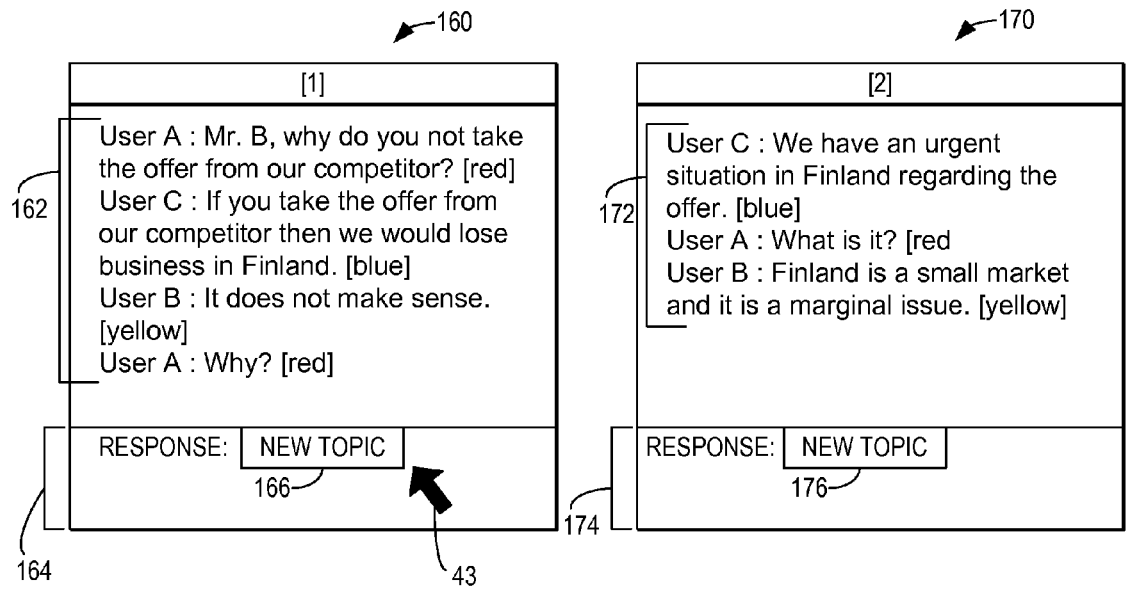
FIG. 17 depicts a graphical representation of multiple messaging windows distinguished by topic in accordance with the method, system and program of the present invention.

With reference now to FIG. 17, there is depicted a graphical representation of multiple messaging windows distinguished by topic in accordance with the method, system and program of the present invention. As illustrated, a graphical display window 160 includes multiple message entries 162 related to topic "[1]" and a graphical display window 170 includes multiple message entries 172 related to topic "[2]". Advantageously, message entries for a single channel are distinguished by topic such that the receiving user can follow multiple topical conversations within a single channel more easily.

Also, as depicted, graphical display window 160 includes a response block 164 and a new topic selection 166 while graphical display window 170 includes a response block 174 and a new topic selection 176. Advantageously, if sending a user enters a message into response block 164, that message is automatically associated with topic "[1]". Alternatively, if a sending user enters a message into response block 174, that message is automatically associated with topic "[2]". In addition, a sending user may select new topic selection 166 or 176 to start a new topic.

Figure 18:
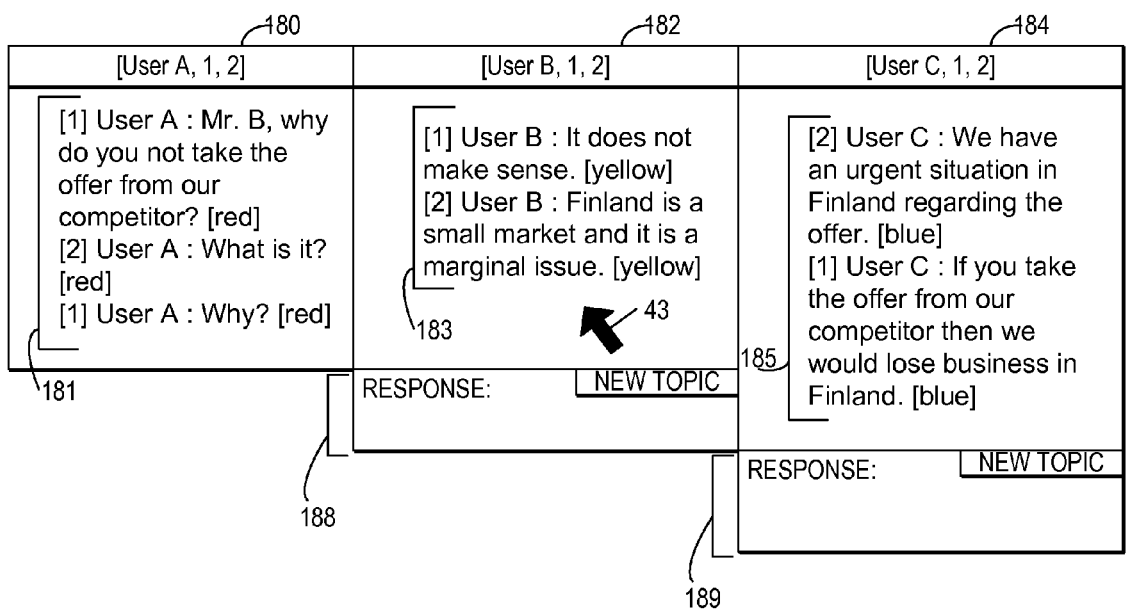
FIG. 18 illustrates a graphical representation of multiple messaging windows distinguished by user and then further distinguished by topic in accordance with the method, system and program of the present invention.

Referring now to FIG. 18, there is illustrated a graphical representation of multiple messaging windows distinguished by user and then further distinguished by topic in accordance with the method, system and program of the present invention. As depicted, a graphical display window 180 includes message entries 181 for user A distinguished by topics "[1]" and "[2]". Next, a graphical display window 182 illustrates message entries 183 for user B also distinguished by topic. Thereafter, graphical display window 184 depicts message entries 185 for user C and topic distinctions. Preferably, a sending user may respond to user B utilizing message block 188 and respond to user C utilizing message block 189. In alternate embodiments, a sending user may select to transmit message entries to a selection of users, such as user B only, without first selecting to separate the channel by user.

While the invention has been particularly shown and described with reference to a preferred embodiment, it will be understood by those skilled in the art that various changes in form and detail may be made therein without departing from the spirit and scope of the invention.

What is claimed is:

1. A method for controlling messaging outputs in a messaging session, said method comprising the steps of:

receiving a plurality of message entries intended for a particular recipient and each associated with a particular topic from among a plurality of topics within a particular channel of an instant messaging session; and controlling output of said plurality of message entries according to output attributes assigned to said plurality of message entries for said particular recipient to distinguish between said plurality of topics according to preferences of said particular recipient, such that output of said plurality of message entries according to topic is distinguished according to said particular recipient receiving said plurality of message entries.

2. The method for controlling messaging outputs in a messaging session according to claim 1, said step of controlling output of said plurality of message entries according to output attributes further comprising the step of:

controlling output of said plurality of message entries according to an assigned graphical output attribute.

3. The method for controlling messaging outputs in a messaging session according to claim 1, said step of controlling output of said plurality of message entries according to output attributes further comprising the step of:

controlling output of said plurality of message entries according to an assigned audible output attribute.

4. The method for controlling messaging outputs in a messaging session according to claim 1, said step of controlling output of said plurality of message entries according to output attributes further comprising the step of:

controlling output of said plurality of message entries to distinguish between said plurality of users.

5. The method for controlling messaging outputs in a messaging session according to claim 1, said step of controlling output of said plurality of message entries according to output attributes further comprising the step of:

controlling output of said plurality of message entries in distinguishable graphical interfaces according to said plurality of topics.

* * * * *